United States Patent [19]
Hays

[11] Patent Number: 5,645,394
[45] Date of Patent: Jul. 8, 1997

[54] UTILITY RAMP

[75] Inventor: William A. Hays, New Albany, Ohio

[73] Assignee: Ohio Steel Industries, Inc., Columbus, Ohio

[21] Appl. No.: 661,823

[22] Filed: Jun. 11, 1996

[51] Int. Cl.[6] .................................................. B65G 67/02
[52] U.S. Cl. .......................................................... 414/537
[58] Field of Search ................................. 414/537; 296/61

[56] References Cited

U.S. PATENT DOCUMENTS

| | | | |
|---|---|---|---|
| 1,967,605 | 7/1934 | Bill | 414/537 |
| 2,603,529 | 7/1952 | Troth et al. | 414/537 |
| 2,650,727 | 9/1953 | Martin | 414/537 |
| 2,797,960 | 7/1957 | Endies et al. | 414/537 |
| 3,779,406 | 12/1973 | Hermann | 414/537 |
| 4,098,414 | 7/1978 | Abiera | 414/537 |
| 4,944,546 | 7/1990 | Keller | 414/537 |
| 5,016,897 | 5/1991 | Kauffman | 414/537 |

*Primary Examiner*—Thomas J. Brahan
*Attorney, Agent, or Firm*—James R. Eley

[57] ABSTRACT

A utility ramp having an overlapping hinge feature. The hinge feature provides a strong utility ramp that permits compact storage through nesting of the ramp sections.

4 Claims, 3 Drawing Sheets

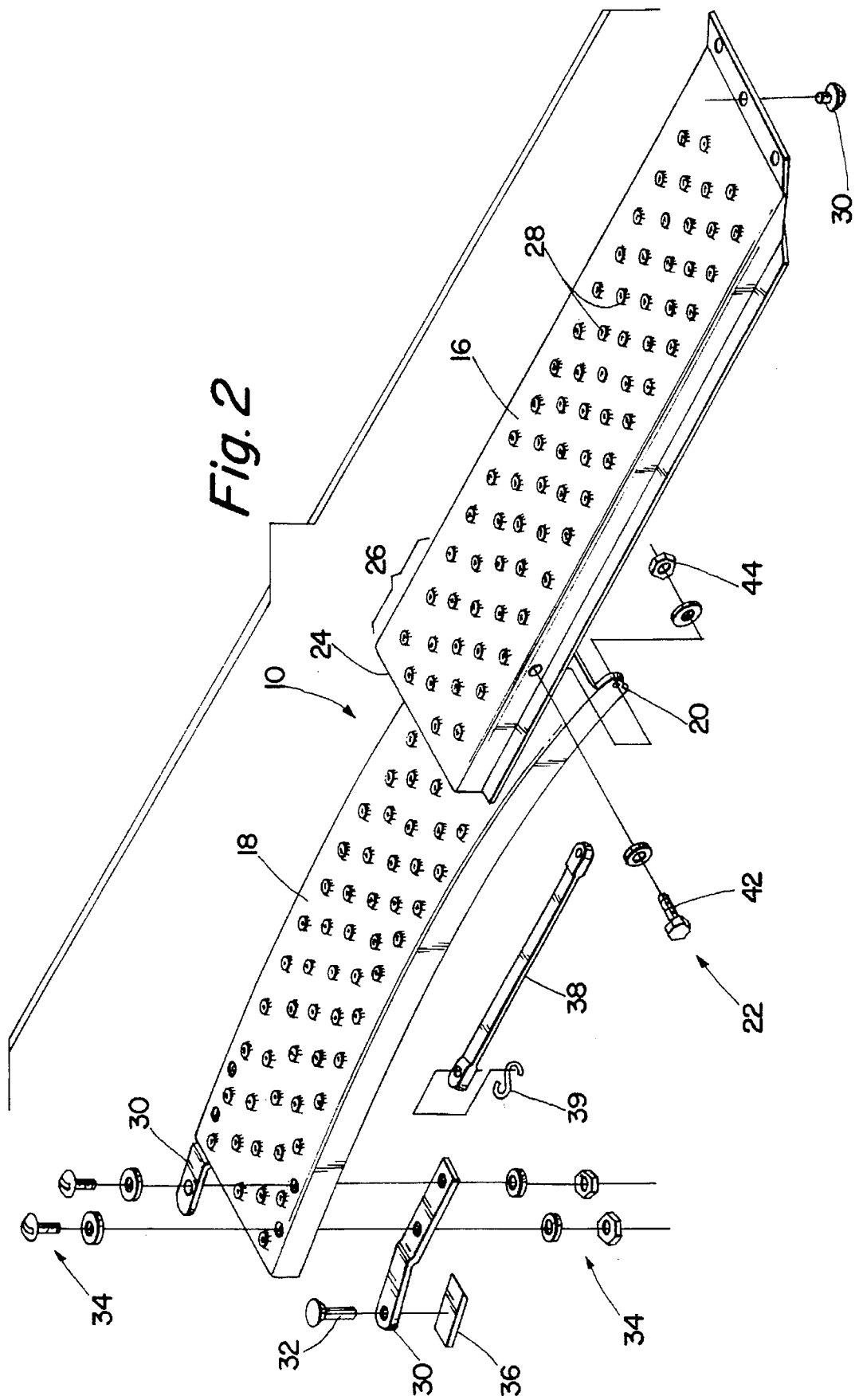

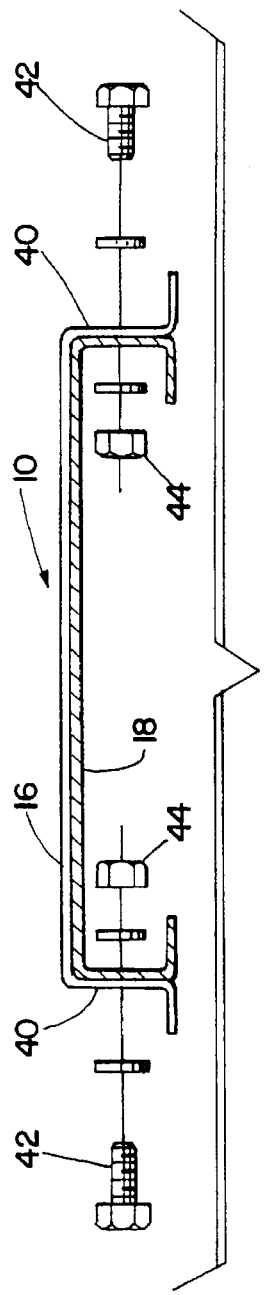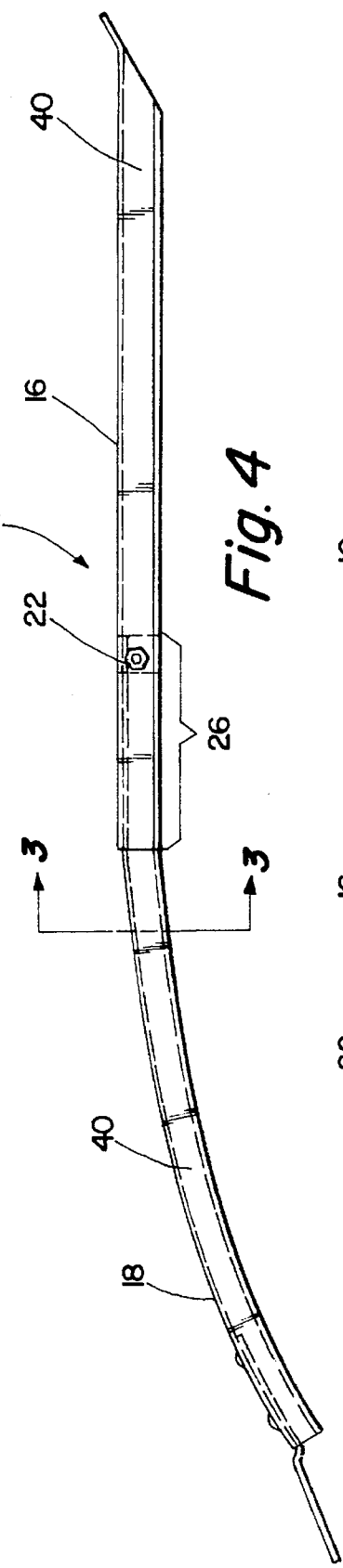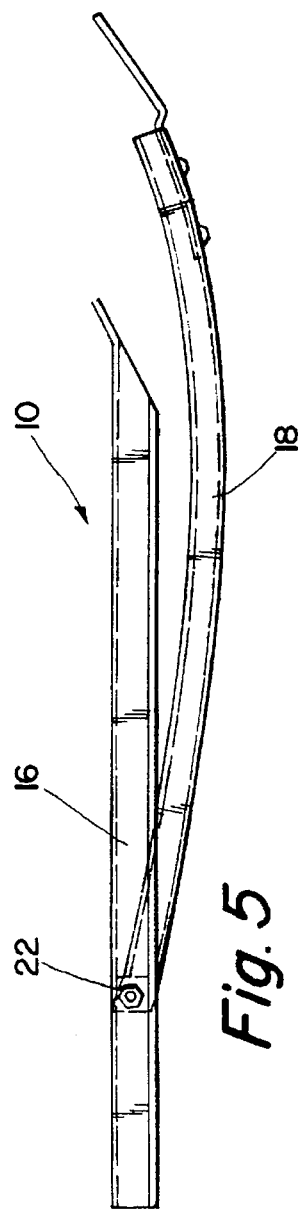

UTILITY RAMP

BACKGROUND OF THE INVENTION

The present invention is directed generally toward utility raps and more particularly toward a utility ramp having overlapping hinge feature which provides significant strength ad support in the hinge while enabling the ramp to fold and nest into a compact unit.

Sport utility vehicle and pickup track owners commonly transport sport vehicles such as ATVs, motorcycles, snowmobiles, etc. as well as small utility vehicles such as lawn mowers, riding/garden tractors, etc. Transportation of these items often involves loading these smaller vehicles onto a larger vehicle. In order to accommodate the loading of these vehicles utility ramps have been developed to raise the small vehicle into the truck.

Utility ramps generally represent a compromise between strength and the ability to be stored compactly. Previous utility ramps have been designed to store compactly by providing a hinge. However, typical hinges limit the load bearing capacity of the ramp. A hinged utility ramp tends to collapse at the hinge. To avoid ramp collapse at the hinge, designers have strengthened the hinged potion in a number of ways. However, the strengthening of the ramp at the hinge has tended to limit the ability of the ramp to store compactly. There is a need for a strong utility ramp which may be stored compactly.

SUMMARY OF THE INVENTION

The present invention is a hinging, locking and nesting cambered ramp. The present invention uses a novel overlapping hinge that provides significant strength across the hinged area. Additionally, the hinge of the present invention and the shape of the ramp enables compact storage through nesting of the ramp sections.

These and other advantages of the present invention will become obvious to one of skill in the art after a review of the following detailed description.

BRIEF DESCRIPTION OF THE DRAWINGS

FIG. 2 is an exploded perspective view of one embodiment of the present invention;

FIG. 3 is a cross-sectional view taken through line 3—3 of FIG. 4;

FIG. 4 is a side elevation view of the assembled embodiment of FIG. 2 in its extended configuration; and FIG. 5 is a side elevation view of the assembled embodiment of FIG. 2 in its compact configuration.

DETAILED DESCRIPTION

Figure 1:
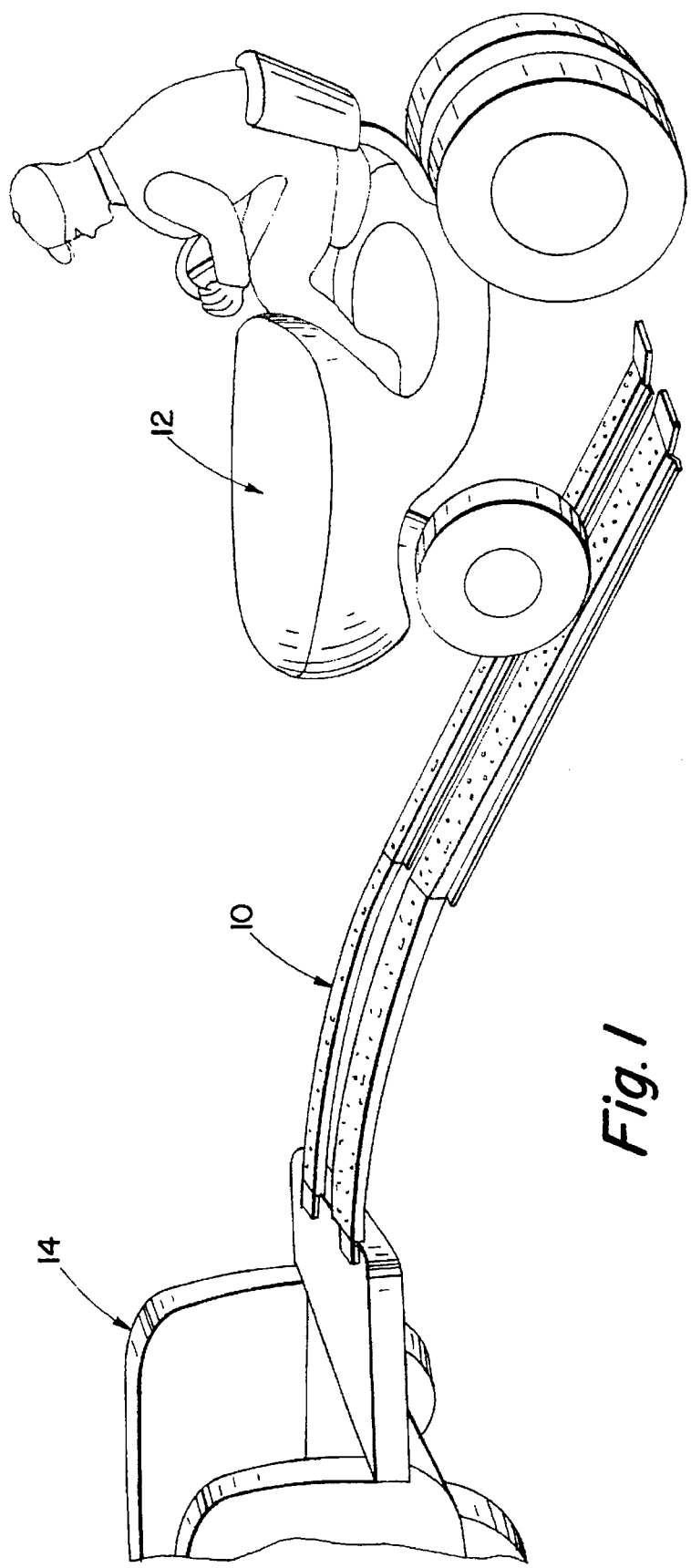
FIG. 1 is a perspective view of one embodiment of the present invention being used to load a vehicle with a small tractor.

Referring to FIG. 1, a utility ramp 10 of the present invention consisting of two independent ramp tracks, is shown engaged with the bed extension, i.e., such as a tailgate, of vehicle 14 and preparing to load a small tractor 12 into the bed of vehicle 14.

Looking now to FIG. 2, an exploded view of the utility ramp 10 is shown. The utility ramp 10 includes a first elongate member 16 and a second elongate member 18 which are hingedly coupled at 20. First elongate member 16 and second elongate member 18 are comprised of 14 gauge steel. The hinge 22 is offset from the end 24 of the first elongate member 16 to provide an overlapping portion 26. First elongate member 16 and second elongate member 18 are provided with a non-skid surface 28.

FIG. 2 also shows support bars 30 which are utilized to connect the utility ramp with the vehicle 14 being loaded or unloaded. Pin 32 is used to connect support bar 30 with the vehicle 14. Support bar 30 is attached to second elongate member 18 by a conventional bolt arrangement 34. Support bar 30 is provided with pads 36 which protect the finish of the vehicle 14 to which the support bar 30 is attached. The utility ramp may be positioned on the vehicle with the support straps merely resting on vehicle 14. Alternatively, receiving holes may be established in vehicle 14 to receive pins 32 for a more secure attachment. Elastic hold down strap 38 is provided for further attachment to the vehicle 14. Elastic hold down strap 38 may be attached with hook 39 to vehicle 14 to hold the ramp 10 down while in use. Lastly, a rubber bumper is shown at 41.

FIG. 3 shows a cross-section of utility ramp 10 taken through section line 3—3 of FIG. 4. The overlapping portion 26 of second elongate member 18 by first elongate member 16 is also shown. Both first elongate member 16 and second elongate member 18 have downward depending side flanges 40. The downward depending side flanges 40 maintain the structural integrity of the first elongate member 16 and second elongate member 18 when carrying a load. In this particular embodiment, first elongate member 16 and second elongate member 18 are hinged together by bolts 42 which are secured by nuts 44.

FIG. 4 shows the utility ramp 10 in its extended configuration. Second elongate member 18 has a cambered shape which provides a smooth transition from the horizontal surface of a vehicle to the sloping surface of the ramp. The cambered form of second elongate member 18 serves to accommodate small vehicles which have low ground clearance. As an example, a lawn tractor may have a cutting deck which has a low clearance. If a non-cambered ramp is used to load the lawn tractor the cutting deck may contact the vehicle at the point where the ramp and the vehicle are attached and prevent or obstruct the loading or unloading of the lawn tractor. The cambered shape of second elongate member 18 avoids this problem by providing a smooth transition between the horizontal vehicle surface and the sloping ramp surface.

FIG. 4 also shows the overlapping portion 26 of first elongate member 16 on second elongate member 18. The overlapping portion 26 prevents the collapse of utility ramp 10 by preventing further rotation of first elongate member 16 about hinge 22 relative to second elongate member 18. The downward depending side flanges 40 of the overlapping portion 26 provide structural integrity to the overlapping portion 26 for preventing rotation about hinge 22.

FIG. 5 shows the utility ramp 10 in its folded configuration. Notice that second elongate member 18 nests within first elongate member 16 to provide a compact unit for storage in the vehicle or elsewhere.

Although this invention has been shown and described with respect to detailed embodiments thereof, it will be understood by those skilled in the art that various changes in form and detail thereof may be made without departing from the scope of the claimed invention.

I claim:

1. A utility ramp for loading a first motorized vehicle having a bed with a second motorized vehicle from a ground level into the bed of said first vehicle comprising:

a first elongate member having a skid resistant upper surface for tractionally engaging the tires of said second vehicle and a proximal and distal extent, wherein said first elongate member is adapted to receive a hinge along a hinge axis, wherein said hinge axis defines an overlapping portion of said first elongate member which extends from said hinge axis to said distal extent, said distal extent of first elongate member being engaged with the ground during loading of a second vehicle; and a cambered second elongate member having a skid resistant upper surface for tractionally engaging the tires of said second vehicle and a proximal and distal extent, said distal extent being engageable with the bed of said first vehicle and being hingedly coupled at said proximal extent of said second elongate member to said first elongate member along said hinge axis and being foldable at the hinge axis against the body of said first member and thus transportable in the bed of said first vehicle when said ramp is not engaged with said vehicle bed.

2. The utility ramp of claim 1, wherein said elongate members have downwardly depending side flanges.

3. The utility ramp of claim 1, further comprising:

at least one support bar attached to and extending from said distal extent of said second elongate member and being engageable with the bed of said first vehicle.

4. The utility ramp of claim 1, further comprising:

an elastic hold down strap attached on one extent near the distal extent of said elongate member and on its other extent to a structural portion of said first vehicle for biasing said ramp in engagement with said first vehicle.

* * * * *